(12) United States Patent
Perry et al.

(10) Patent No.: US 6,948,355 B1
(45) Date of Patent: Sep. 27, 2005

(54) IN-USE RATE BASED CALCULATION FOR A FUEL VAPOR PRESSURE MANAGEMENT APPARATUS

(75) Inventors: Paul Perry, Chatham (CA); Andre Veinotte, Dresden (CA)

(73) Assignee: Siemens VDO Automotive, Incorporated, Chatham (CA)

(*) Notice: Subject to any disclaimer, the term of this patent is extended or adjusted under 35 U.S.C. 154(b) by 45 days.

(21) Appl. No.: 10/667,902

(22) Filed: Sep. 23, 2003

Related U.S. Application Data

(60) Provisional application No. 60/412,578, filed on Sep. 23, 2002.

(51) Int. Cl.[7] .................................................. G01M 3/04
(52) U.S. Cl. .......................................................... 73/49.2
(58) Field of Search .............................. 73/40, 40.5 R, 73/49.2, 118.1; 123/518, 519, 520; 702/51

(56) References Cited

U.S. PATENT DOCUMENTS

| | | |
|---|---|---|
| 322,084 A | 7/1885 | Wilder |
| 2,204,706 A | 6/1940 | Searle |
| 2,318,962 A | 5/1943 | Parker |
| 2,679,946 A | 6/1954 | Friend |
| 3,413,840 A | 12/1968 | Basile et al. |
| 3,741,282 A | 6/1973 | Soberski |
| 4,368,366 A | 1/1983 | Kitamura et al. |
| 4,819,607 A | 4/1989 | Aubel |
| 4,842,015 A | 6/1989 | Haak et al. |
| 4,926,825 A | 5/1990 | Ohtaka et al. |
| 4,949,695 A | 8/1990 | Uranishi et al. |
| 4,951,701 A | 8/1990 | Boehmer |
| 4,962,744 A | 10/1990 | Uranishi et al. |
| 5,021,071 A | 6/1991 | Reddy |
| 5,036,823 A | 8/1991 | MacKinnon |
| 5,088,466 A | 2/1992 | Tada |
| 5,105,789 A | 4/1992 | Aramaki et al. |
| 5,113,834 A | 5/1992 | Aramaki |
| 5,116,257 A | 5/1992 | Szlaga |
| 5,143,035 A | 9/1992 | Kayanuma |
| 5,146,902 A | 9/1992 | Cook et al. |
| 5,150,689 A | 9/1992 | Yano et al. |
| 5,158,054 A | 10/1992 | Otsuka |
| 5,191,870 A | 3/1993 | Cook |
| 5,224,511 A | 7/1993 | Schnettler |
| 5,253,629 A | 10/1993 | Fornuto et al. |
| 5,263,462 A | 11/1993 | Reddy |
| 5,295,472 A | 3/1994 | Otsuka et al. |
| 5,373,822 A | 12/1994 | Thompson |
| 5,449,018 A | 9/1995 | Harris |
| 5,524,662 A | 6/1996 | Benjey et al. |

(Continued)

FOREIGN PATENT DOCUMENTS

| | | |
|---|---|---|
| WO | WO-91/12426 | 8/1991 |

(Continued)

OTHER PUBLICATIONS

U.S. Appl. No. 10/758,239, filed Jan. 16, 2004, Veinotte, Flow Sensor Integrated with Leak Detection for Purge Valve Diagnostic.

(Continued)

*Primary Examiner*—Charles Garber

(57) ABSTRACT

A system and method of evaluating a leak detection test that is performed on a headspace of a fuel system. The system includes a fuel vapor pressure management apparatus, an algorithm that calculates an in-use rate value by dividing a number of monitoring events by a number of driving events of the vehicle, and a computer that compares the in-use rate value to a standard value.

18 Claims, 7 Drawing Sheets

U.S. PATENT DOCUMENTS

| | | | |
|---|---|---|---|
| 5,863,025 | A | 1/1999 | Noya |
| 5,911,209 | A | 6/1999 | Kouda et al. |
| 6,328,021 | B1 | 12/2001 | Perry et al. |
| 6,450,152 | B1 | 9/2002 | Everingham |
| 6,460,566 | B1 | 10/2002 | Perry et al. |
| 6,478,045 | B1 | 11/2002 | Perry |
| 6,564,780 | B2 | 5/2003 | Hanai et al. |

FOREIGN PATENT DOCUMENTS

| | | |
|---|---|---|
| WO | WO-01/38716 | 5/2001 |

OTHER PUBLICATIONS

U.S. Appl. No. 10/758,273, filed Jan. 16, 2004, Veinotte et al., Flow Sensor for Purge Valve Diagnostic.

U.S. Appl. No. 10/758,272, filed Jan. 16, 2004, Veinotte et al., Flow Sensor for Purge Valve Diagnostic.

U.S. Appl. No. 10/758,238, filed Jan. 16, 2004, Veinotte, Flow Sensor Integrated with Leak Detection for Purge Valve Diagnostic.

U.S. Appl. No. 10/736,773, filed Dec. 17, 2003, Perry et al., Apparatus, System and Method of Establishing a Test Threshold for a Fuel Vapor Leak Detection System.

U.S. Appl. No. 10/170,420, filed Jun. 14, 2002, Veinotte, Apparatus and Method for Preventing Resonance in a Fuel Vapor Pressure Management Apparatus.

U.S. Appl. No. 10/667,903, filed Sep. 23, 2003, Veinotte et al., Rationality Testing for a Fuel Vapor Pressure Management Apparatus.

U.S. Appl. No. 10/171,469, filed Jun. 14, 2002, Veinotte et al., A method of Managing Fuel Vapor Pressure in a Fue System.

U.S. Appl. No. 10/171,470, filed Jun. 14, 2002, Veinotte, Bi-Directional Flow Seal for a Fuel Vapor Pressure Management Apparatus.

U.S. Appl. No. 10/667,963, filed Sep. 23, 2003, Veinotte et al., Apparatus and Method of Changing Printed Circuit Boards in a Fuel Vapor Pressure Management.

U.S. Appl. No. 10/667,965, filed Sep. 23, 2003, Veinotte, Method of Designing a Fuel Vapor Pressure Management Apparatus.

U.S. Appl. No. 10/171,471, filed Jun. 14, 2002, Veinotte, Apparatus and Method for Calibrating a Fuel Management Apparatus.

U.S. Appl. No. 10/171,472, filed Jun. 14, 2002, Veinotte, A Poppet for a Fuel Vapor Pressure Management Apparatus.

U.S. Appl. No. 10/171,473, filed Jun. 14, 2002, Veinotte, Method for Fuel Vapor Pressure Management.

U.S. Appl. No. 10/170,395, filed Jun. 14, 2002, Veinotte, Apparatus for Fuel Vapor Pressure Management.

U.S. Appl. No. 10/170,397, filed Jun. 14, 2002, Veinotte, Fuel System Including an Apparatus for Fuel Vapor Pressure Management Apparatus.

OBDII Systems and Components , Siemens' Document, Aug. 28, 1992, 16 pages.

Proposal for Pressure Testing the Evaporative System, (OBDII), Siemens' Document, May 11, 1992, 18 pages.

IN-USE RATE BASED CALCULATION FOR A FUEL VAPOR PRESSURE MANAGEMENT APPARATUS

CROSS REFERENCE TO RELATED APPLICATIONS

This application claims the benefit of the earlier filing date of U.S. Provisional Application No. 60/412,578, filed 23 Sep. 2002, which is incorporated by reference herein in its entirety.

Related co-pending U.S. Utility application Ser. Nos. 10/170,397, 10/170,395, 10/171,473, 10/171,472, 10/171,471, 10/171,470, 10/171,469, and 10/170,420, all of which were filed 14 Jun. 2002, are incorporated by reference herein in their entirety.

Related co-pending applications that are being filed concurrently herewith are identified by Ser. Nos. 10/667,965 ("Method Of Designing A Fuel Vapor Pressure Management Apparatus"), 10/667,963 ("Apparatus And Method Of Changing Printed Circuit Boards In A Fuel Vapor Pressure Management Apparatus"), and 10/667,903 ("Rationality Testing For A Fuel Vapor Pressure Management Apparatus"), all of which are incorporated by reference herein in their entirety.

FIELD OF THE INVENTION

A fuel vapor pressure management apparatus and method that manages pressure and detects leaks in a fuel system. In particular, a fuel vapor pressure management apparatus and method that vents positive pressure, vents excess negative pressure, and uses evaporative natural vacuum to perform a leak diagnostic.

BACKGROUND OF THE INVENTION

Conventional fuel systems for vehicles with internal combustion engines can include a canister that accumulates fuel vapor from a headspace of a fuel tank. If there is a leak in the fuel tank, the canister, or any other component of the fuel system, fuel vapor could escape through the leak and be released into the atmosphere instead of being accumulated in the canister. Various government regulatory agencies, e.g., the U.S. Environmental Protection Agency and the Air Resources Board of the California Environmental Protection Agency, have promulgated standards related to limiting fuel vapor releases into the atmosphere. Thus, it is believed that there is a need to avoid releasing fuel vapors into the atmosphere, and to provide an apparatus and a method for performing a leak diagnostic, so as to comply with these standards.

In such conventional fuel systems, excess fuel vapor can accumulate immediately after engine shutdown, thereby creating a positive pressure in the fuel vapor pressure management system. Excess negative pressure in closed fuel systems can occur under some operating and atmospheric conditions, thereby causing stress on components of these fuel systems. Thus, it is believed that there is a need to vent, or "blow-off," the positive pressure, and to vent, or "relieve," the excess negative pressure. Similarly, it is also believed to be desirable to relieve excess positive pressure that can occur during tank refueling. Thus, it is believed that there is a need to allow air, but not fuel vapor, to exit the tank at high flow rates during tank refueling. This is commonly referred to as onboard refueling vapor recovery (ORVR).

SUMMARY OF THE INVENTION

The present invention provides a system of evaluating a leak detection test that is performed on a headspace of a fuel system. The fuel system supplies fuel to an internal combustion engine of a vehicle. The system includes a fuel vapor pressure management apparatus and a processor. The fuel vapor pressure management apparatus includes a housing that defines an interior chamber, a pressure operable device that separates the interior chamber into first and second portions, and a sensor that detects the first arrangement of the pressure operable device during the leak detection test. The pressure operable device includes a poppet that is movable along an axis, and a seal that is adapted to cooperatively engage the poppet. The first arrangement of the pressure operable device occurs during the leak detection test when there is a first negative pressure level in the first portion relative to the second portion and the seal is in a first deformed configuration. A second arrangement of the pressure operable device permits a first fluid flow from the second portion to the first portion when the seal is in a second deformed configuration. And a third arrangement of the pressure operable device permits a second fluid flow from the first portion to the second portion when the seal is in an undeformed configuration. The processor calculates an in-use rate value by dividing a number of monitoring events by a number of driving events of the vehicle, and compares the in-use rate value to a standard value. The number of monitoring events is based on the sensor detecting the first arrangement.

The present invention also provides a method of evaluating a leak detection test performed on a headspace of a fuel system. The fuel system supplies fuel to an internal combustion engine of a vehicle. The method includes performing the leak detection test with a fuel vapor pressure management apparatus, calculating an in-use rate equal to a number of monitoring events divided by a number of driving events, and comparing the calculated in-use rate to a standard value. The fuel vapor pressure management apparatus includes a housing that defines an interior chamber, a pressure operable device that separates the interior chamber into first and second portions, and a sensor. The pressure operable device includes a poppet that moves along an axis, and a seal that is adapted to cooperatively engage the poppet. A first arrangement of the pressure operable device occurs during the leak detection test when there is a first negative pressure level in the first portion relative to the second portion and the seal is in a first deformed configuration. A second arrangement of the pressure operable device permits a first fluid flow from the second portion to the first portion when the seal is in a second deformed configuration. And a third arrangement of the pressure operable device permits a second fluid flow from the first portion to the second portion when the seal is in an undeformed configuration. The sensor detects the first arrangement of the pressure operable device during the leak detection test.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

As it is used in this description, "atmosphere" generally refers to the gaseous envelope surrounding the Earth, and "atmospheric" generally refers to a characteristic of this envelope.

As it is used in this description, "pressure" is measured relative to the ambient atmospheric pressure. Thus, positive pressure refers to pressure greater than the ambient atmospheric pressure and negative pressure, or "vacuum," refers to pressure less than the ambient atmospheric pressure.

Also, as it is used in this description, "headspace" refers to the variable volume within an enclosure, e.g. a fuel tank, that is above the surface of the liquid, e.g., fuel, in the enclosure. In the case of a fuel tank for volatile fuels, e.g., gasoline, vapors from the volatile fuel may be present in the headspace of the fuel tank.

Figure 1:
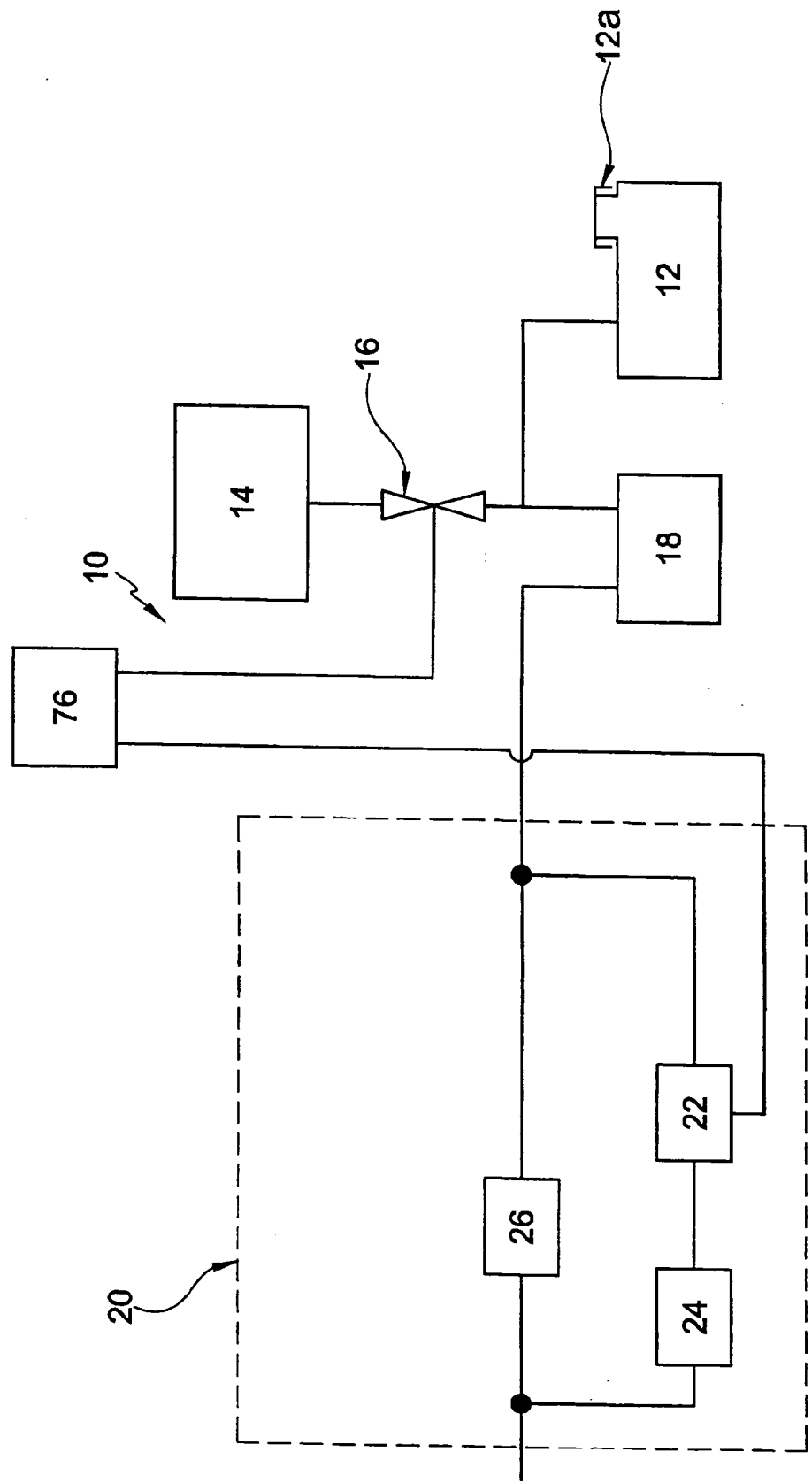
FIG. 1 is a schematic illustration of a fuel system, in accordance with the detailed description of the preferred embodiment, which includes a fuel vapor pressure management apparatus.

Referring to FIG. 1, a fuel system 10, e.g., for an engine (not shown), includes a fuel tank 12, a vacuum source 14 such as an intake manifold of the engine, a purge valve 16, a charcoal canister 18, and a fuel vapor pressure management apparatus 20.

The fuel vapor pressure management apparatus 20 performs a plurality of functions including signaling 22 that a first predetermined pressure (vacuum) level exists, "vacuum relief" or relieving negative pressure 24 at a value below the first predetermined pressure level, and "pressure blow-off" or relieving positive pressure 26 above a second pressure level.

Other functions are also possible. For example, the fuel vapor pressure management apparatus 20 can be used as a vacuum regulator, and in connection with the operation of the purge valve 16 and an algorithm, can perform large leak detection on the fuel system 10. Such large leak detection could be used to evaluate situations such as when a refueling cap 12a is not replaced on the fuel tank 12.

It is understood that volatile liquid fuels, e.g., gasoline, can evaporate under certain conditions, e.g., rising ambient temperature, thereby generating fuel vapor. In the course of cooling that is experienced by the fuel system 10, e.g., after the engine is turned off, a vacuum is naturally created by cooling the fuel vapor and air, such as in the headspace of the fuel tank 12 and in the charcoal canister 18. According to the present description, the existence of a vacuum at the first predetermined pressure level indicates that the integrity of the fuel system 10 is satisfactory. Thus, signaling 22 is used to indicate the integrity of the fuel system 10, i.e., that there are no appreciable leaks. Subsequently, the vacuum relief 24 at a pressure level below the first predetermined pressure level can protect the fuel tank 12, e.g., can prevent structural distortion as a result of stress caused by vacuum in the fuel system 10.

After the engine is turned off, the pressure blow-off 26 allows excess pressure due to fuel evaporation to be vented, and thereby expedite the occurrence of vacuum generation that subsequently occurs during cooling. The pressure blow-off 26 allows air within the fuel system 10 to be released while fuel vapor is retained. Similarly, in the course of refueling the fuel tank 12, the pressure blow-off 26 allows air to exit the fuel tank 12 at a high rate of flow.

At least two advantages are achieved in accordance with a system including the fuel vapor pressure management apparatus 20. First, a leak detection diagnostic can be performed on fuel tanks of all sizes. This advantage is significant in that previous systems for detecting leaks were not effective with known large volume fuel tanks, e.g., 100 gallons or more. Second, the fuel vapor pressure management apparatus 20 is compatible with a number of different types of the purge valve, including digital and proportional purge valves.

Figure 2A:
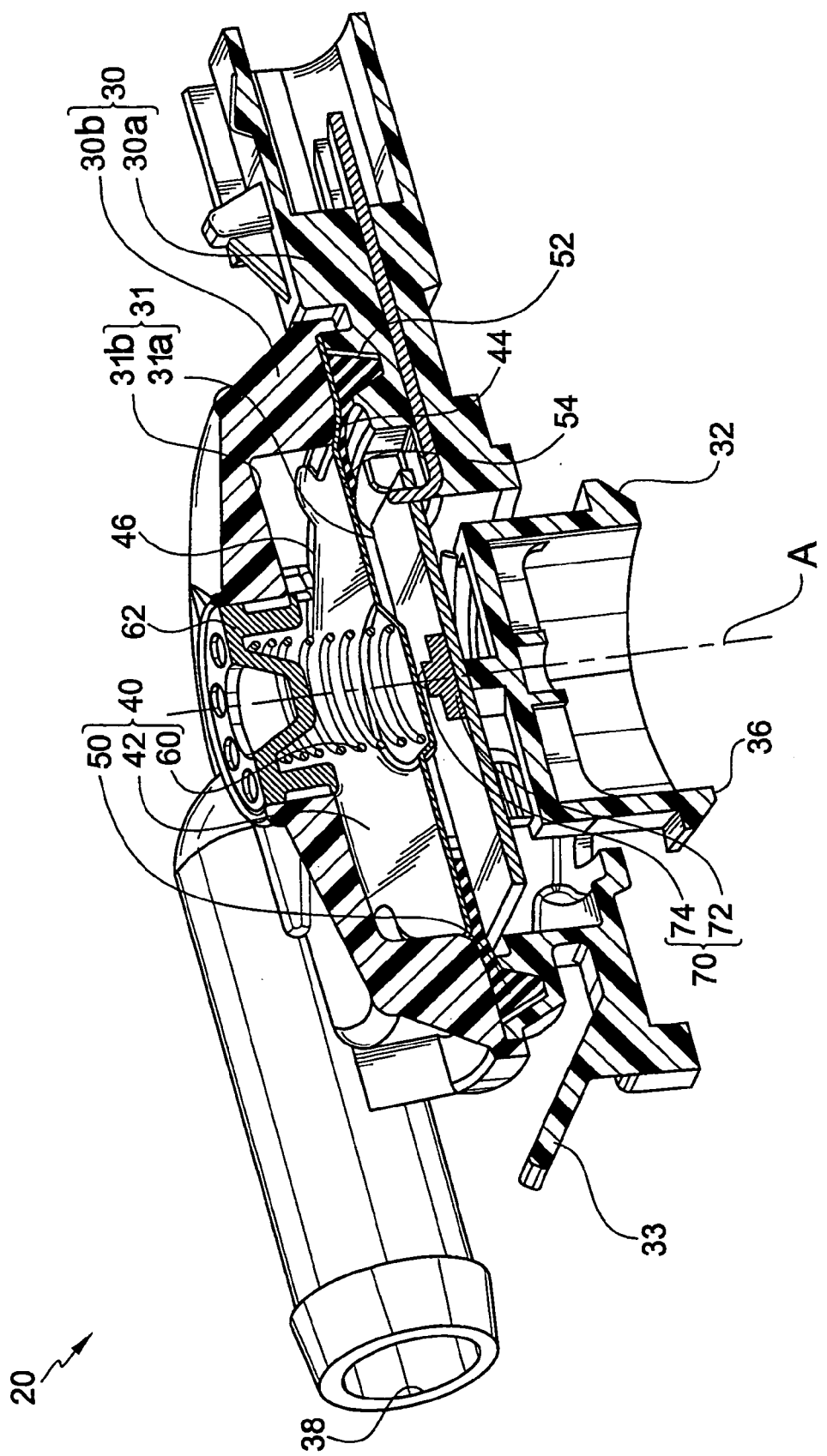
FIG. 2A is a first cross sectional view of the fuel vapor pressure management apparatus illustrated in FIG. 1.

FIG. 2A shows an embodiment of the fuel vapor pressure management apparatus 20 that is particularly suited to being mounted on the charcoal canister 18. The fuel vapor pressure management apparatus 20 includes a housing 30 that can be mounted to the body of the charcoal canister 18 by a "bayonet" style attachment 32. A seal (not shown) can be interposed between the charcoal canister 18 and the fuel vapor pressure management apparatus 20 so as to provide a fluid tight connection. The attachment 32, in combination with a snap finger 33, allows the fuel vapor pressure management apparatus 20 to be readily serviced in the field. Of course, different styles of attachments between the fuel vapor pressure management apparatus 20 and the body of the charcoal canister 18 can be substituted for the illustrated bayonet attachment 32. Examples of different attachments include a threaded attachment, and an interlocking telescopic attachment. Alternatively, the charcoal canister 18 and the housing 30 can be bonded together (e.g., using an adhesive), or the body of the charcoal canister 18 and the housing 30 can be interconnected via an intermediate member such as a rigid pipe or a flexible hose.

The housing 30 defines an interior chamber 31 and can be an assembly of a first housing part 30a and a second housing part 30b. The first housing part 30a includes a first port 36 that provides fluid communication between the charcoal canister 18 and the interior chamber 31. The second housing part 30b includes a second port 38 that provides fluid communication, e.g., venting, between the interior chamber 31 and the ambient atmosphere. A filter (not shown) can be interposed between the second port 38 and the ambient atmosphere for reducing contaminants that could be drawn into the fuel vapor pressure management apparatus 20 during the vacuum relief 24 or during operation of the purge valve 16.

In general, it is desirable to minimize the number of housing parts to reduce the number of potential leak points, i.e., between housing pieces, which must be sealed.

An advantage of the fuel vapor pressure management apparatus 20 is its compact size. The volume occupied by the fuel vapor pressure management apparatus 20, including the interior chamber 31, is less than all other known leak detection devices, the smallest of which occupies more than 240 cubic centimeters. That is to say, the fuel vapor pressure management apparatus 20, from the first port 36 to the second port 38 and including the interior chamber 31, occupies less than 240 cubic centimeters. In particular, the fuel vapor pressure management apparatus 20 occupies a volume of less than 100 cubic centimeters. This size reduction over known leak detection devices is significant given the limited availability of space in contemporary automobiles.

A pressure operable device 40 can separate the interior chamber 31 into a first portion 31a and a second portion 31b. The first portion 31a is in fluid communication with the charcoal canister 18 through the first port 36, and the second portion 31b is in fluid communication with the ambient atmosphere through the second port 38.

The pressure operable device 40 includes a poppet 42, a seal 50, and a resilient element 60. During the signaling 22, the poppet 42 and the seal 50 cooperatively engage one another to prevent fluid communication between the first and second ports 36,38. During the vacuum relief 24, the poppet 42 and the seal 50 cooperatively engage one another to permit restricted fluid flow from the second port 38 to the first port 36. During the pressure blow-off 26, the poppet 42 and the seal 50 disengage one another to permit substantially unrestricted fluid flow from the first port 36 to the second port 38.

The pressure operable device 40, with its different arrangements of the poppet 42 and the seal 50, may be considered to constitute a bi-directional check valve. That is to say, under a first set of conditions, the pressure operable device 40 permits fluid flow along a path in one direction, and under a second set of conditions, the same pressure operable device 40 permits fluid flow along the same path in the opposite direction. The volume of fluid flow during the pressure blow-off 26 may be three to ten times as great as the volume of fluid flow during the vacuum relief 24.

The pressure operable device 40 operates without an electromechanical actuator, such as a solenoid that is used in a known leak detection device to controllably displace a fluid flow control valve. Thus, the operation of the pressure operable device 40 can be controlled exclusively by the pressure differential between the first and second ports 36,38. Preferably, all operations of the pressure operable device 40 are controlled by fluid pressure signals that act on one side, i.e., the first port 36 side, of the pressure operable device 40.

The pressure operable device 40 also operates without a diaphragm. Such a diaphragm is used in the known leak detection device to sub-partition an interior chamber and to actuate the flow control valve. Thus, the pressure operable device 40 exclusively separates, and then only intermittently, the interior chamber 31. That is to say, there are at most two portions of the interior chamber 31 that are defined by the housing 30.

The poppet 42 is preferably a low density, substantially rigid disk through which fluid flow is prevented. The poppet 42 can be flat or formed with contours, e.g., to enhance rigidity or to facilitate interaction with other components of the pressure operable device 40.

The poppet 42 can have a generally circular form that includes alternating tabs 44 and recesses 46 around the perimeter of the poppet 42. The tabs 44 can center the poppet 42 within the second housing part 30b, and guide movement of the poppet 42 along an axis A. The recesses 46 can provide a fluid flow path around the poppet 42, e.g., during the vacuum relief 24 or during the pressure blow-off 26. A plurality of alternating tabs 44 and recesses 46 are illustrated, however, there could be any number of tabs 44 or recesses 46, including none, e.g., a disk having a circular perimeter. Of course, other forms and shapes may be used for the poppet 42.

The poppet 42 can be made of any metal (e.g., aluminum), polymer (e.g., nylon), or another material that is impervious to fuel vapor, is low density, is substantially rigid, and has a smooth surface finish. The poppet 42 can be manufactured by stamping, casting, or molding. Of course, other materials and manufacturing techniques may be used for the poppet 42.

The seal 50 can have an annular form including a bead 52 and a lip 54. The bead 52 can be secured between and seal the first housing part 30a with respect to the second housing part 30b. The lip 54 can project radially inward from the bead 52 and, in its undeformed configuration, i.e., as-molded or otherwise produced, project obliquely with respect to the axis A. Thus, preferably, the lip 54 has the form of a hollow frustum. The seal 50 can be made of any material that is sufficiently elastic to permit many cycles of flexing the seal 50 between undeformed and deformed configurations.

Preferably, the seal 50 is molded from rubber or a polymer, e.g., nitrites or fluorosilicones. More preferably, the seal has a stiffness of approximately 50 durometer (Shore A), and is self-lubricating or has an anti-friction coating, e.g., polytetrafluoroethylene.

Figure 2B:
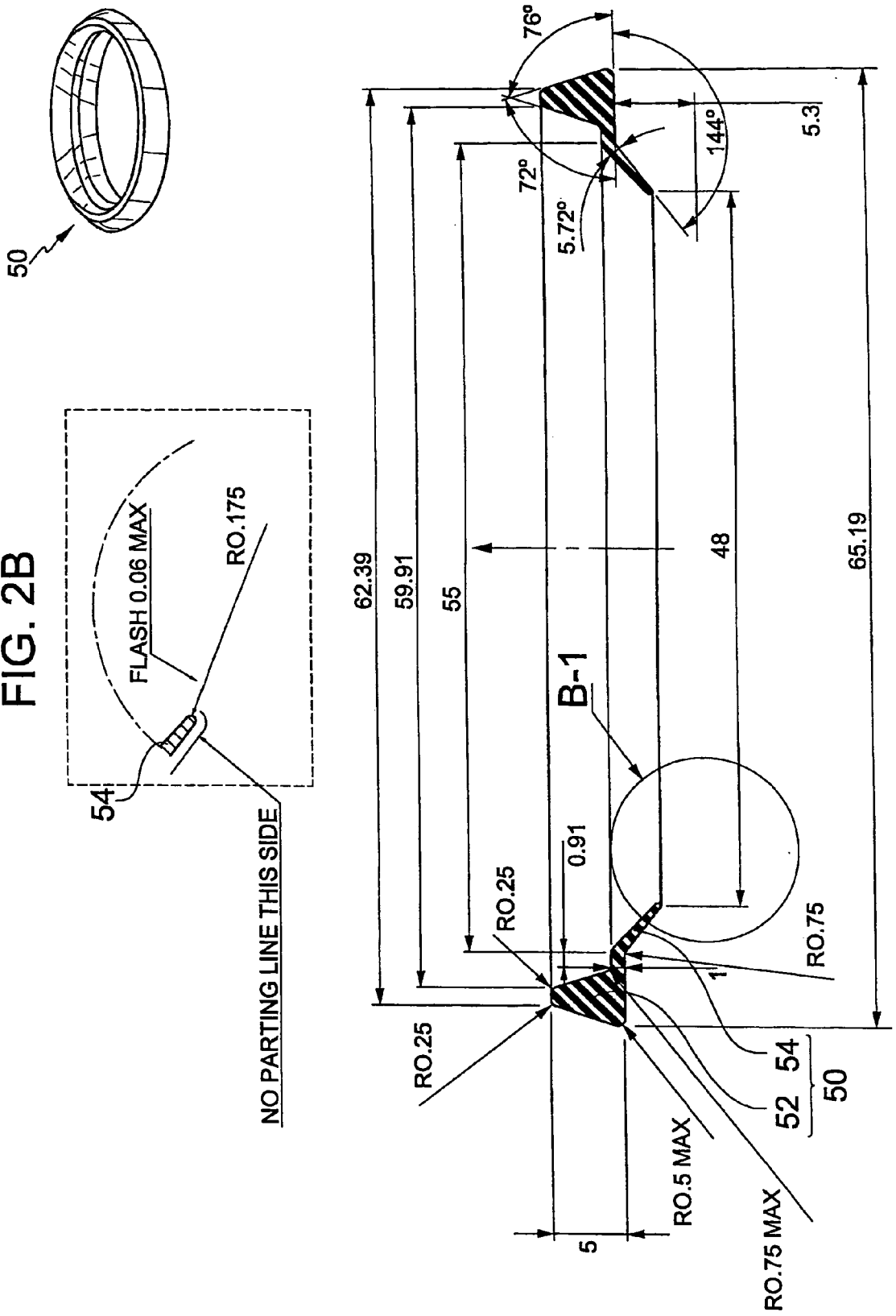
FIG. 2B are detail views of a seal for the fuel vapor pressure management apparatus shown in FIG. 2A.

FIG. 2B shows an exemplary embodiment of the seal 50, including the relative proportions of the different features. Preferably, this exemplary embodiment of the seal 50 is made of Santoprene 123-40.

The resilient element 60 biases the poppet 42 toward the seal 50. The resilient element 60 can be a coil spring that is positioned between the poppet 42 and the second housing part 30b. Preferably, such a coil spring is centered about the axis A.

Different embodiments of the resilient element 60 can include more than one coil spring, a leaf spring, or an elastic block. The different embodiments can also include various materials, e.g., metals or polymers. And the resilient element 60 can be located differently, e.g., positioned between the first housing part 30a and the poppet 42.

It is also possible to use the weight of the poppet 42, in combination with the force of gravity, to urge the poppet 42 toward the seal 50. As such, the biasing force supplied by the resilient element 60 could be reduced or eliminated.

The resilient element 60 provides a biasing force that can be calibrated to set the value of the first predetermined pressure level. The construction of the resilient element 60, in particular the spring rate and length of the resilient member, can be provided so as to set the value of the second predetermined pressure level.

A switch 70 can perform the signaling 22. Preferably, movement of the poppet 42 along the axis A actuates the switch 70. The switch 70 can include a first contact fixed with respect to a body 72 and a movable contact 74. The body 72 can be fixed with respect to the housing 30, e.g., the first housing part 30a, and movement of the poppet 42 displaces movable contact 74 relative to the body 72, thereby closing or opening an electrical circuit in which the switch 70 is connected. In general, the switch 70 is selected so as to require a minimal actuation force, e.g., 50 grams or less, to displace the movable contact 74 relative to the body 72.

Different embodiments of the switch 70 can include magnetic proximity switches, piezoelectric contact sensors, or any other type of device capable of signaling that the poppet 42 has moved to a prescribed position or that the poppet 42 is exerting a prescribed force on the movable contact 74.

Figure 2C:
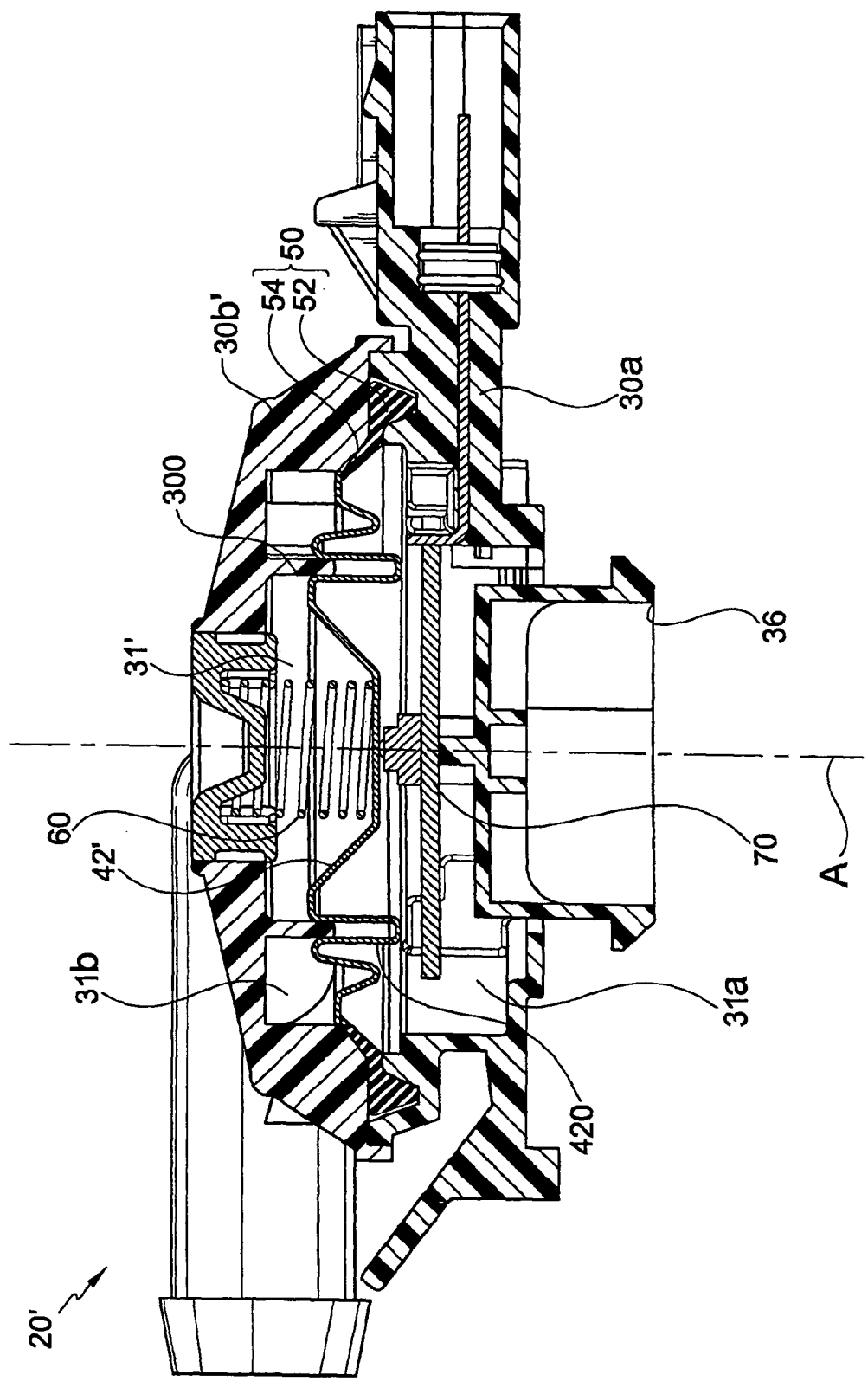
FIG. 2C is a second cross sectional view of the fuel vapor pressure management apparatus illustrated in FIG. 1.

Referring now to FIG. 2C, there is shown an alternate embodiment of the fuel vapor pressure management apparatus 20'. As compared to FIG. 2A, the fuel vapor pressure management apparatus 20' provides an alternative second housing part 30b' and an alternate poppet 42'. Otherwise, the same reference numbers are used to identify similar parts in the two embodiments of the fuel vapor pressure management apparatus 20 and 20'.

The second housing part 30b' includes a wall 300 projecting into the chamber 31 and surrounding the axis A. The poppet 42' includes at least one corrugation 420 that also surrounds the axis A. The wall 300 and the at least one corrugation 420 are sized and arranged with respect to one another such that the corrugation 420 telescopically receives the wall 300 as the poppet 42' moves along the axis A, i.e., to provide a dashpot type structure. Preferably, the wall 300 and the at least one corrugation 420 are right-circle cylinders.

The wall 300 and the at least one corrugation 420 cooperatively define a sub-chamber 310 within the chamber 31'. Movement of the poppet 42' along the axis A causes fluid displacement between the chamber 31' and the sub-chamber 310. This fluid displacement has the effect of damping resonance of the poppet 42'. A metering aperture (not show) could be provided to define a dedicated flow channel for the displacement of fluid between the chamber 31' and the sub-chamber 310'.

As it is shown in FIG. 2C, the poppet 42' can include additional corrugations that can enhance the rigidity of the poppet 42', particularly in the areas at the interfaces with the seal 50 and the resilient element 60.

The signaling 22 occurs when vacuum at the first predetermined pressure level is present at the first port 36. During the signaling 22, the poppet 42 and the seal 50 cooperatively engage one another to prevent fluid communication between the first and second ports 36,38.

The force created as a result of vacuum at the first port 36 causes the poppet 42 to be displaced toward the first housing part 30a. This displacement is opposed by elastic deformation of the seal 50. At the first predetermined pressure level, e.g., one inch of water vacuum relative to the atmospheric pressure, displacement of the poppet 42 will actuate the switch 70, thereby opening or closing an electrical circuit that can be monitored by an electronic control unit 76. As vacuum is released, i.e., the pressure at the first port 36 rises above the first predetermined pressure level, the elasticity of the seal 50 pushes the poppet 42 away from the switch 70, thereby resetting the switch 70.

Figure 3A:
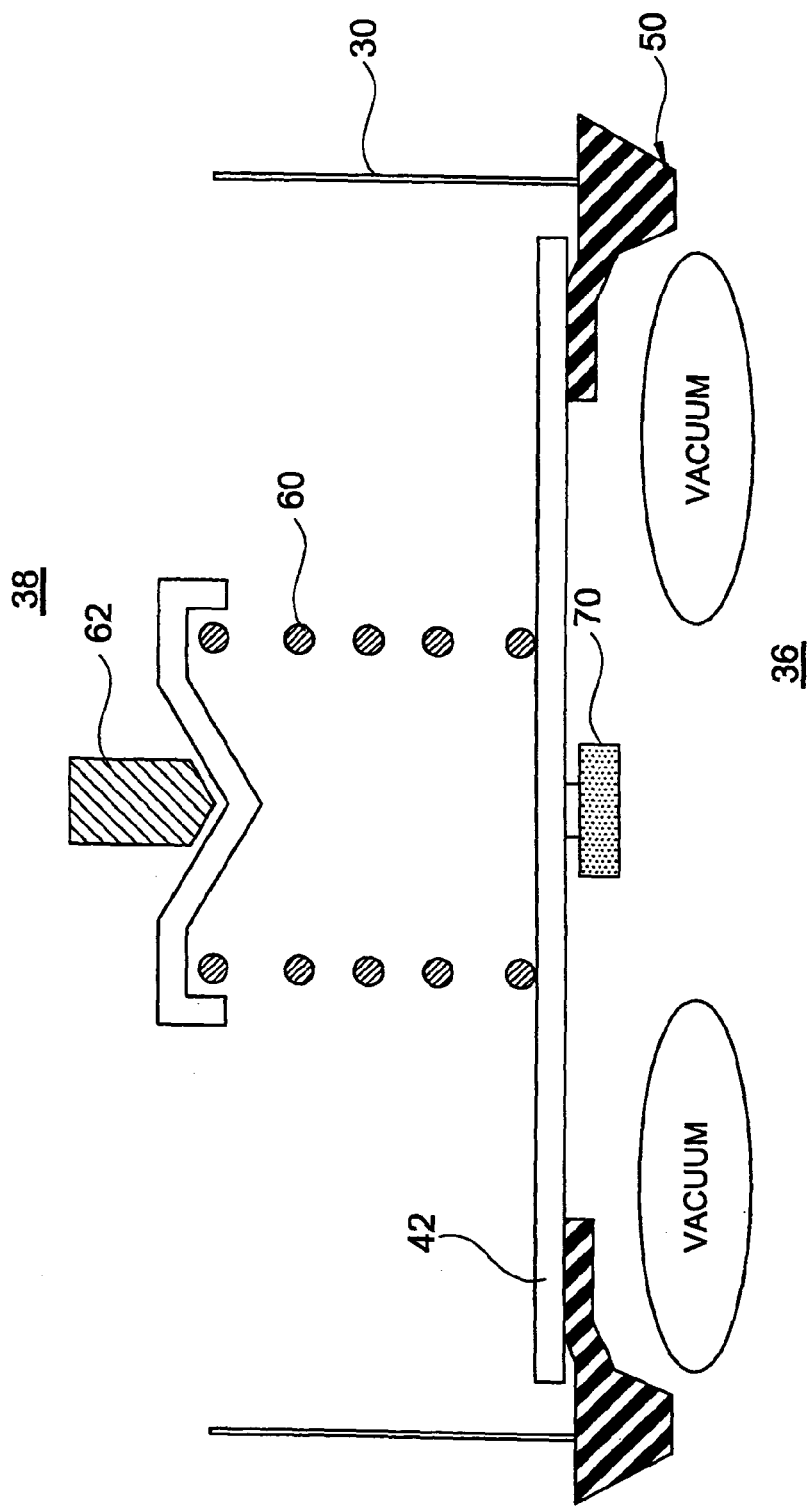
FIG. 3A is a schematic illustration of a leak detection arrangement of the fuel vapor pressure management apparatus illustrated in FIG. 1.

During the signaling 22, there is a combination of forces that act on the poppet 42, i.e., the vacuum force at the first port 36 and the biasing force of the resilient element 60. This combination of forces moves the poppet 42 along the axis A to a position that deforms the seal 50 in a substantially symmetrical manner. This arrangement of the poppet 42 and seal 50 are schematically indicated in FIG. 3A. In particular, the poppet 42 has been moved to its extreme position against the switch 70, and the lip 54 has been substantially uniformly pressed against the poppet 42 such that there is, preferably, annular contact between the lip 54 and the poppet 42.

In the course of the seal 50 being deformed during the signaling 22, the lip 54 slides along the poppet 42 and performs a cleaning function by scraping-off any debris that may be on the poppet 42.

The vacuum relief 24 occurs as the pressure at the first port 36 further decreases, i.e., the pressure decreases below the first predetermined pressure level that actuates the switch 70. At some level of vacuum that is below the first predetermined level, e.g., six inches of water vacuum relative to atmosphere, the vacuum acting on the seal 50 will deform the lip 54 so as to at least partially disengage from the poppet 42.

Figure 3B:
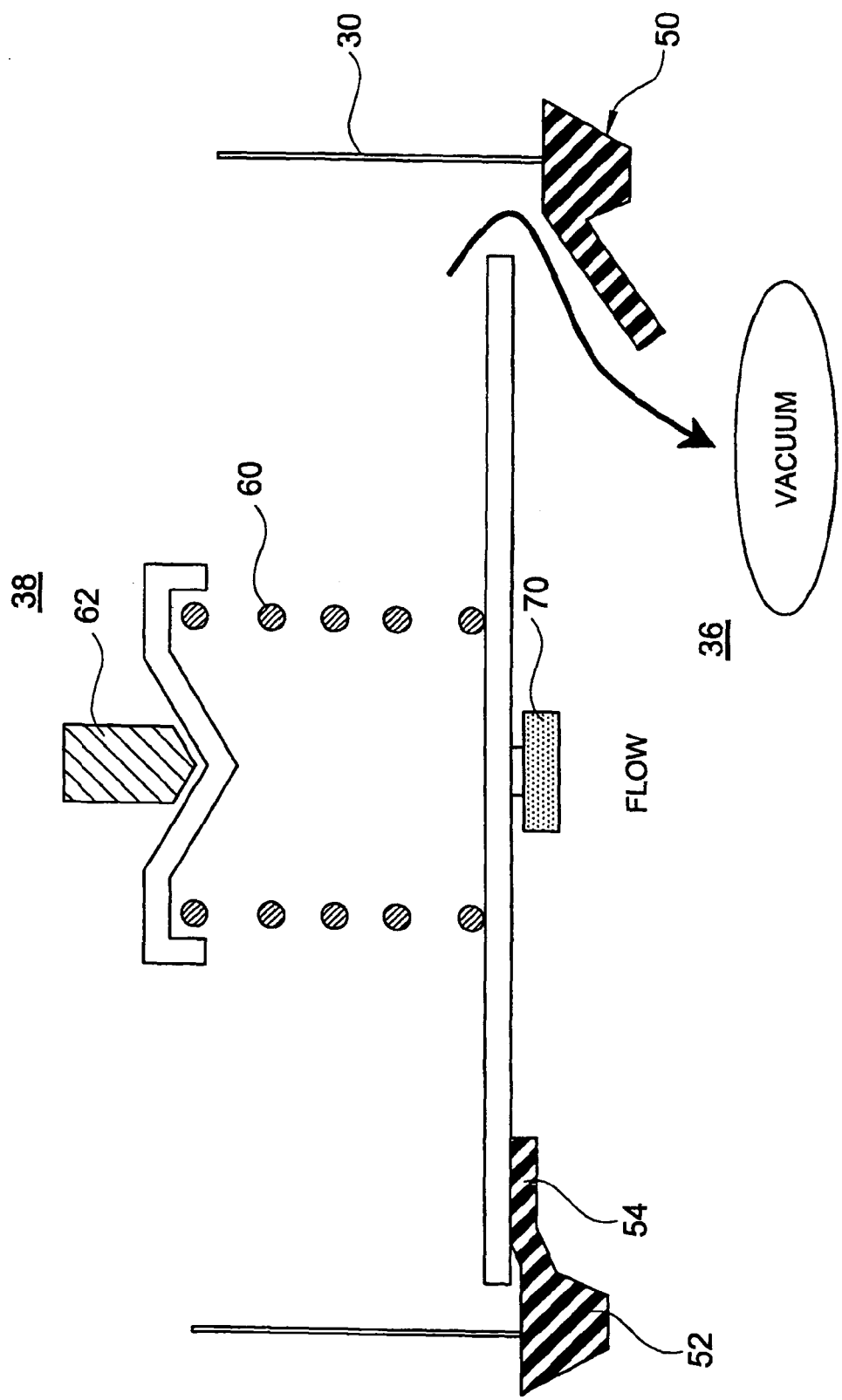
FIG. 3B is a schematic illustration of a vacuum relief arrangement of the fuel vapor pressure management apparatus illustrated in FIG. 1.

During the vacuum relief 24, it is believed that, at least initially, the vacuum relief 24 causes the seal 50 to deform in an asymmetrical manner. This arrangement of the poppet 42 and seal 50 are schematically indicated in FIG. 3B. A weakened section of the seal 50 could facilitate propagation of the deformation. In particular, as the pressure decreases below the first predetermined pressure level, the vacuum force acting on the seal 50 will, at least initially, cause a gap between the lip 54 and the poppet 42. That is to say, a portion of the lip 54 will disengage from the poppet 42 such that there will be a break in the annular contact between the lip 54 and the poppet 42, which was established during the signaling 22. The vacuum force acting on the seal 50 will be relieved as fluid, e.g., ambient air, flows from the atmosphere, through the second port 38, through the gap between the lip 54 and the poppet 42, through the first port 36, and into the canister 18.

The fluid flow that occurs during the vacuum relief 24 is restricted by the size of the gap between the lip 54 and the poppet 42. It is believed that the size of the gap between the lip 54 and the poppet 42 is related to the level of the pressure below the first predetermined pressure level. Thus, a small gap is all that is formed to relieve pressure slightly below the first predetermined pressure level, and a larger gap is formed to relieve pressure that is significantly below the first predetermined pressure level. This resizing of the gap is performed automatically by the seal 50 in accordance with the construction of the lip 54, and is believed to eliminate pulsations due to repeatedly disengaging and reengaging the seal 50 with respect to the poppet 42. Such pulsations could arise due to the vacuum force being relieved momentarily during disengagement, but then building back up as soon as the seal 50 is reengaged with the poppet 42.

Figure 3C:
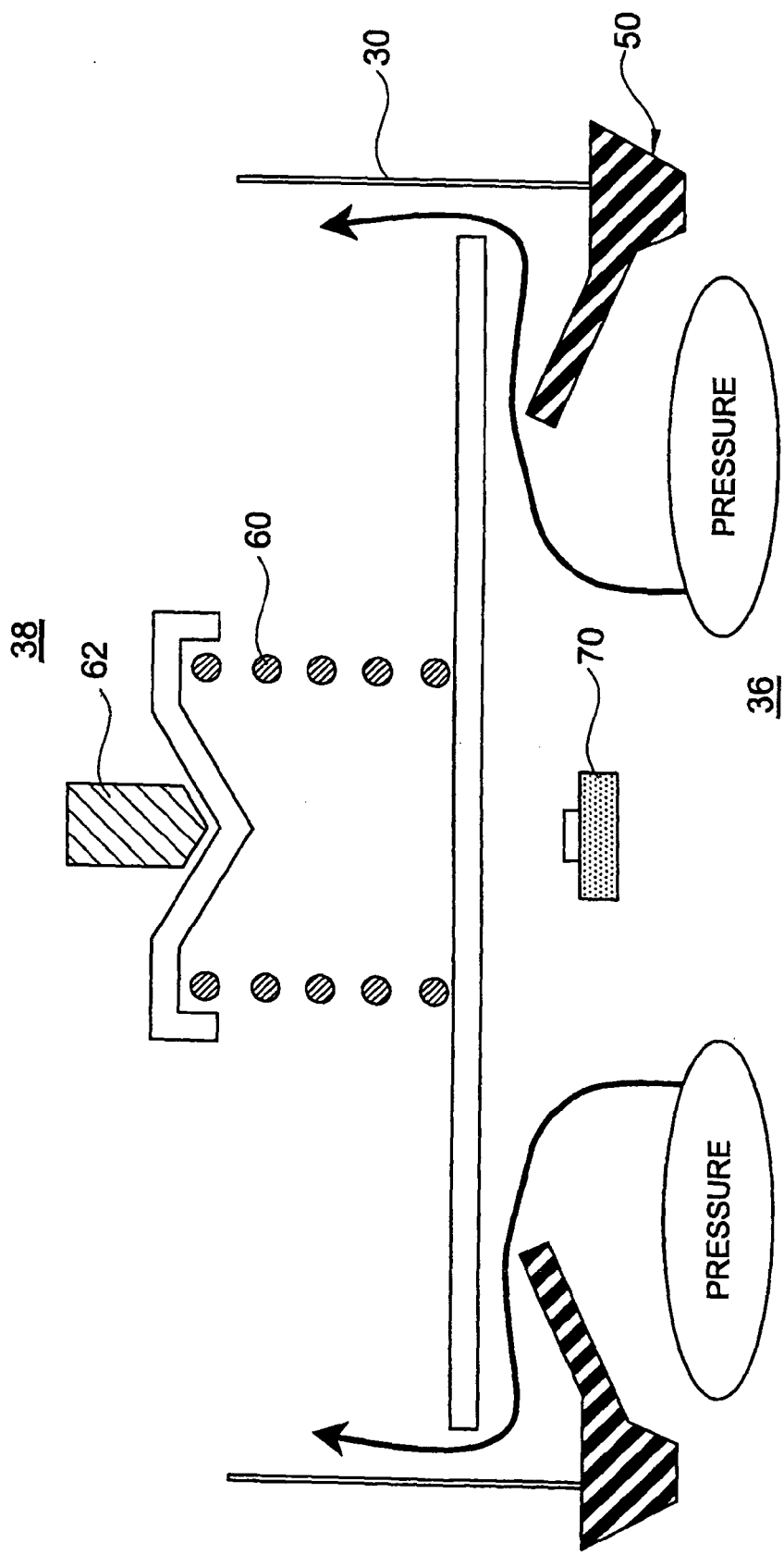
FIG. 3C is a schematic illustration of a pressure blow-off arrangement of the fuel vapor pressure management apparatus illustrated in FIG. 1.

Referring now to FIG. 3C, the pressure blow-off 26 occurs when there is a positive pressure above a second predetermined pressure level at the first port 36. For example, the pressure blow-off 26 can occur when the tank 12 is being refueled. During the pressure blow-off 26, the poppet 42 is displaced against the biasing force of the resilient element 60 so as to space the poppet 42 from the lip 54. That is to say, the poppet 42 will completely separate from the lip 54 so as to eliminate the annular contact between the lip 54 and the poppet 42, which was established during the signaling 22. This separation of the poppet 42 from the seal 50 enables the lip 54 to assume an undeformed configuration, i.e., it returns to its "as-originally-manufactured" configuration. The pressure at the second predetermined pressure level will be relieved as fluid flows from the canister 18, through the first port 36, through the space between the lip 54 and the poppet 42, through the second port 38, and into the atmosphere.

The fluid flow that occurs during the pressure blow-off 26 is substantially unrestricted by the space between the poppet 42 and the lip 54. That is to say, the space between the poppet 42 and the lip 54 presents very little restriction to the fluid flow between the first and second ports 36,38.

At least four advantages are achieved in accordance with the operations performed by the fuel vapor pressure management apparatus 20. First, providing a leak detection diagnostic using vacuum monitoring during natural cooling, e.g., after the engine is turned off. Second, providing relief for vacuum below the first predetermined pressure level, and providing relief for positive pressure above the second predetermined pressure level. Third, vacuum relief provides fail-safe purging of the canister 18. And fourth, the relieving pressure 26 regulates the pressure in the fuel tank 12 during any situation in which the engine is turned off, thereby limiting the amount of positive pressure in the fuel tank 12 and allowing the cool-down vacuum effect to occur sooner.

It is desirable to provide a means of evaluating the methodology used and the results obtained during leak detection testing of the fuel system 10. In particular, according to a preferred embodiment, it is desirable to monitor the frequency of successful leak detection tests, which can be expressed as an "in-use rate calculation" for the system 10. The fundamental basis for the in-use rate calculation according to the preferred embodiment is Charles's Law, which states that in a closed system (i.e., having a constant volume of fluid), a change in the temperature of the fluid is proportional to a change in the pressure of the fluid.

The ability of a leak detection test to accurately indicate the absence or presence of a leak can be undermined, for example, if the leak detection test is performed too infrequently, or if the conditions under which the test is performed render inaccurate the test results. One example of test conditions that may cause inaccurate results is referred to as a "hot garage cycle," which occurs when the engine is operated for a short period of time and the vehicle is subsequently stored in a warm garage. Under these conditions, there is insufficient opportunity for the occurrence of any significant natural vacuum in the fuel system 10, which may result in a false indication that there is a leak present in the fuel system 10. Thus, it is believed that there is a need to consider the frequency of testing and the quality of the test conditions in order to properly interpret the results of leak detection testing.

According to a preferred embodiment, the in-use rate calculation is an indicator of the frequency that successful leak detection tests are performed, and is calculated as a ratio of the numbers of "monitoring events" per "driving events," i.e., as N/D.

According to the preferred embodiment, the number of driving events D can only be incremented when the following combination of events occur: 1) engine operation is initiated from a cold start, 2) there is a minimum of ten minutes engine running time, 3) there is minimum of five minutes of cumulative vehicle operation at or above 25 miles per hour, 4) there is a minimum of 30 seconds of engine idle, 5) the ambient temperature is between 40 degrees Fahrenheit and 95 degrees Fahrenheit, and 6) the altitude during engine operation is below 8000 feet.

According to the preferred embodiment, there are at least two methods by which the number of monitoring events N can be incremented. According to the "statistical" method, the number of monitoring events N is incremented when the following combination of events occur: within a total accumulated time of 24 hours there is a minimum of one engine running occurrence and a minimum of one engine hot soak that lasts at least two hours. As it is used herein, "hot soak" refers the period after which the engine is turned "off" after having reached its operating temperature. Alternatively, according to the "decay" method, the number of monitoring events N is incremented when the temperature decays, i.e., decreases, a minimum of four degrees Celsius for a minimum of two hours. According to a preferred embodiment, the temperature is that of the fluid per se in the headspace, but may also be another temperature that can be correlated with that of the fluid in the headspace. For example, it may be possible to correlate measurements of the ambient temperature proximate to the fuel tank 12 with the temperature of fluid in the headspace.

An advantage of the statistical method according to the preferred embodiment is that the in-use rate can be calculated without taking a temperature measurement. Thus, there is no need to provide a temperature sensor according to the statistical method. An advantage of the decay method is that the validation of a leak detection test can be obtained in as few as a single vehicle operation. Preferably, at least two vehicle operations are included in the decay method.

According to a preferred embodiment using the statistical method, the occurrence of a minimum number, e.g., five, unsuccessful 24 hour tests that are logged in series is indicative of a malfunction of the system 10, which can be indicated by illuminating a vehicle dash mounted malfunction indicator light (MIL).

According to a preferred embodiment, a circuit provided on a printed circuit board can perform the in-use rate calculation. Such a printed circuit board can, for example, also be used to support the switch 70 with respect to the housing 30.

Under circumstances when the in-rate use calculation exceeds a predetermined value, the interpretation of the leak detection testing results can reasonably be validated. The predetermined minimum value for the N/D ratio can be establish by a vehicle manufacturer as a requirement, or regulated by a government agency. For example, it is believed that the California Air Resources Board has established a minimum N/D=0.336.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A system of evaluating a leak detection test performed on a headspace of a fuel system supplying fuel to an internal combustion engine of a vehicle, the system comprising:
   a fuel vapor pressure management apparatus including:
   a housing defining an interior chamber;
   a pressure operable device separating the interior chamber into first and second portions, the pressure operable device including a poppet movable along an axis and a seal adapted to cooperatively engage the poppet, a first arrangement of the pressure operable device occurs during the leak detection test when there is a first negative pressure level in the first portion relative to the second portion and the seal is in a first deformed configuration, a second arrangement of the pressure operable device permits a first fluid flow from the second portion to the first portion when the seal is in a second deformed configuration, and a third arrangement of the pressure operable device permits a second fluid flow from the first portion to the second portion when the seal is in an undeformed configuration; and
   a sensor detecting the first arrangement of the pressure operable device during the leak detection test; and
   a processor that (1) calculates an in-use rate value by dividing a number of monitoring events by a number of driving events of the vehicle, the number of monitoring events being based on the sensor detecting the first arrangement; and (2) compares the in-use rate value to a standard value.

2. The system according to claim 1, wherein the sensor detecting the first arrangement comprises at least one of a switch contacted by the movement of the poppet and a proximity sensor detecting the movement of the poppet.

3. The system according to claim 1, further comprising: a memory storing the number of monitoring events and storing the number of driving events.

4. The system according to claim 1, further comprising: a system malfunction indicator coupled to the computer, the system malfunction indicator is actuated in response the computer determining that the in-use rate value is less than the standard value.

5. The system according to claim 4, wherein the standard value comprises 0.336.

6. The system according to claim 1, further comprising: a temperature sensor detecting a temperature decrease of at least one of a temperature of fuel vapor in the headspace and a temperature that correlates to the fuel vapor in the headspace.

7. The system according to claim 1, further comprising: a control unit for the internal combustion engine, the control unit electrically communicating with the processor.

8. The system according to claim 7, wherein the processor and the control unit are integrated within a common case.

9. The system according to claim 7, wherein the processor stands alone from the control unit.

10. The system according to claim 9, wherein the processor is integrated within the housing.

11. A method of evaluating a leak detection test performed on a headspace of a fuel system supplying fuel to an internal combustion engine of a vehicle, the system comprising:
performing the leak detection test with a fuel vapor pressure management apparatus including:
a housing defining an interior chamber;
a pressure operable device separating the interior chamber into first and second portions, the pressure operable device including a poppet movable along an axis and a seal adapted to cooperatively engage the poppet, a first arrangement of the pressure operable device occurs during the leak detection test when there is a first negative pressure level in the first portion relative to the second portion and the seal is in a first deformed configuration, a second arrangement of the pressure operable device permits a first fluid flow from the second portion to the first portion when the seal is in a second deformed configuration, and a third arrangement of the pressure operable device permits a second fluid flow from the first portion to the second portion when the seal is in an undeformed configuration; and
a sensor detecting the first arrangement of the pressure operable device during the leak detection test;
calculating an in-use rate equal to a number of monitoring events divided by a number of driving events; and
comparing the calculated in-use rate to a standard value.

12. The method according to claim 11, wherein the calculating comprises incrementing the number of driving events when 1) the internal combustion engine operation is initiated from a cold start, 2) the internal combustion engine runs a minimum of ten minutes, 3) the vehicle accumulates a minimum of five minutes of operation at a minimum of 25 miles per hour, 4) the internal combustion engine idles a minimum of 30 seconds, 5) the internal combustion engine operation is in an ambient temperature between 40 degrees Fahrenheit and 95 degrees Fahrenheit, and 6) the internal combustion engine operates at an altitude below 8000 feet.

13. The method according to claim 12, wherein the calculating comprises incrementing the number of monitoring events according to at least one of a statistical method and a decay method.

14. The method according to claim 13, wherein the calculating comprises incrementing the number of monitoring events according to the statistical method when, within a twenty-four hour period, the internal combustion engine is operated a minimum of one occurrence and the internal combustion engine operation includes a hot soak lasting a minimum of two hours.

15. The method according to claim 14, further comprising:
indicating a system malfunction when a predetermined number of unsuccessful twenty-four hour tests occur in series.

16. The method according to claim 15, wherein the predetermined number comprises a minimum of five unsuccessful twenty-four hour tests.

17. The method according to claim 13, wherein the calculating comprises incrementing the number of monitoring events according to the decay method, including detecting a temperature decreases of a minimum of four degrees Celsius for a minimum of two hours.

18. The method according to claim 17, wherein the temperature comprises at least one of a temperature of fuel vapor in the headspace and a temperate that correlates to the fuel vapor in the headspace.

* * * * *